O. R. BECKER.
HAY DERRICK.
APPLICATION FILED AUG. 30, 1910.

979,057.

Patented Dec. 20, 1910.
2 SHEETS—SHEET 1.

Witnesses
L. D. Lindsay
M. C. Mattingly

Inventor
Otto R. Becker
By Greeley & McIntire
Attorney

O. R. BECKER.
HAY DERRICK.
APPLICATION FILED AUG. 30, 1910.

979,057.

Patented Dec. 20, 1910.

2 SHEETS—SHEET 2.

Witnesses
L. D. Lindsay
M. C. Mattingly

Inventor
Otto R. Becker

By Greeley & McIntire
Attorney

UNITED STATES PATENT OFFICE.

OTTO R. BECKER, OF MONTROSE, COLORADO.

HAY-DERRICK.

979,057.

Specification of Letters Patent.  Patented Dec. 20, 1910.

Application filed August 30, 1910. Serial No. 579,656.

*To all whom it may concern:*

Be it known that I, OTTO R. BECKER, a native-born citizen of the United States, residing at Montrose, in the county of Montrose and State of Colorado, have invented certain new and useful Improvements in Hay-Derricks; and I do hereby declare the following to be a full, clear, and exact description of the invention, such as will enable others skilled in the art to which it appertains to make and use the same.

The present invention relates to certain new and useful improvements in hay derricks, and has for its object to provide a device of this character which is simple and inexpensive in its construction, and which embodies novel features of construction whereby the hay can be readily elevated and turned into any desired position before being deposited upon the stack.

The invention further contemplates the provision of a hay derrick which is strong and durable in its construction, which can be readily carried from place to place, and which can be successfully operated even when a strong wind is blowing.

With these and other objects in view, the invention consists in certain combinations and arrangements of the parts as will more fully appear as the description proceeds, the novel features thereof being pointed out in the appended claims.

For a full understanding of the invention, reference is to be had to the following description and accompanying drawings, in which:—

Figure 1:
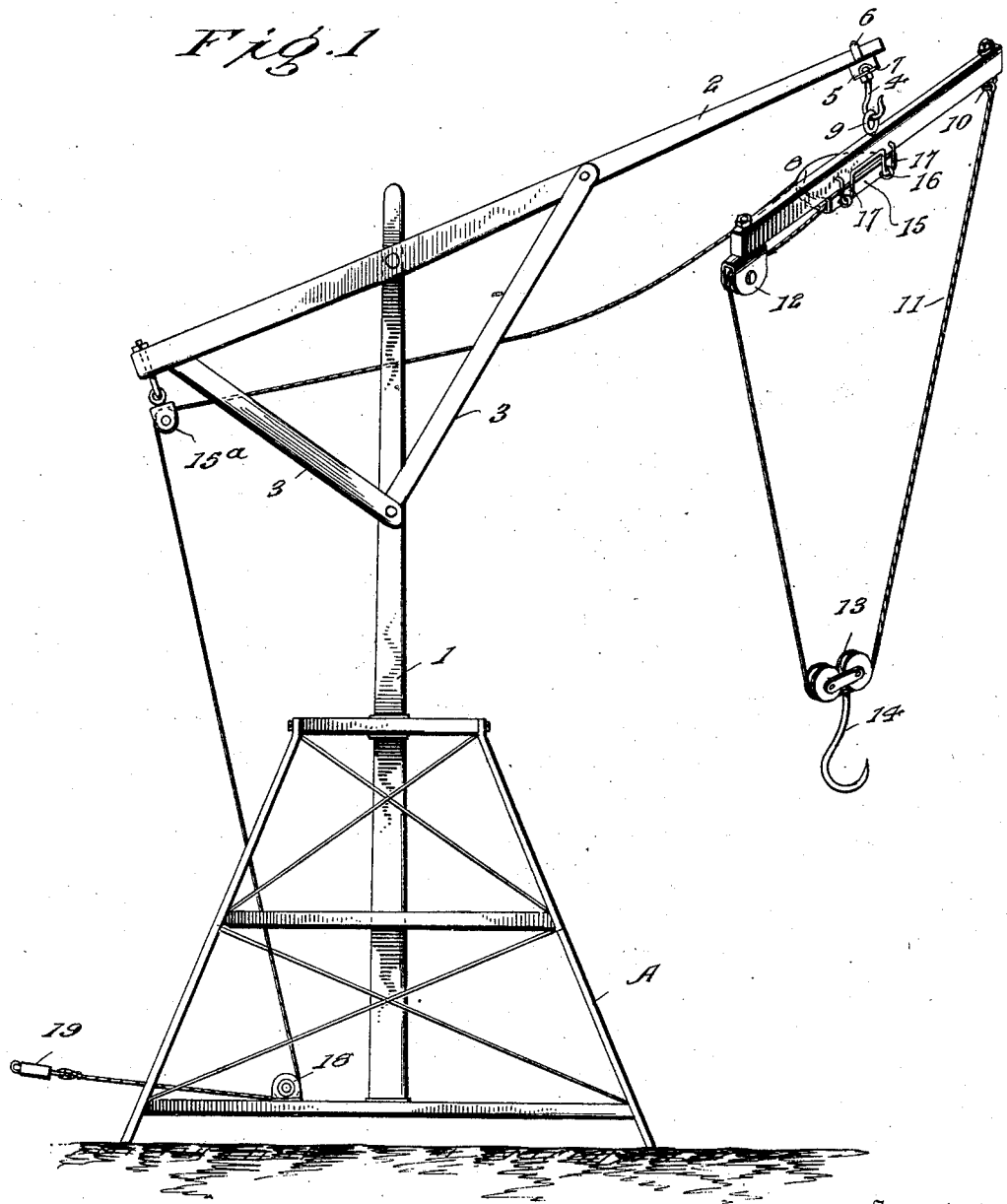
Figure 2:
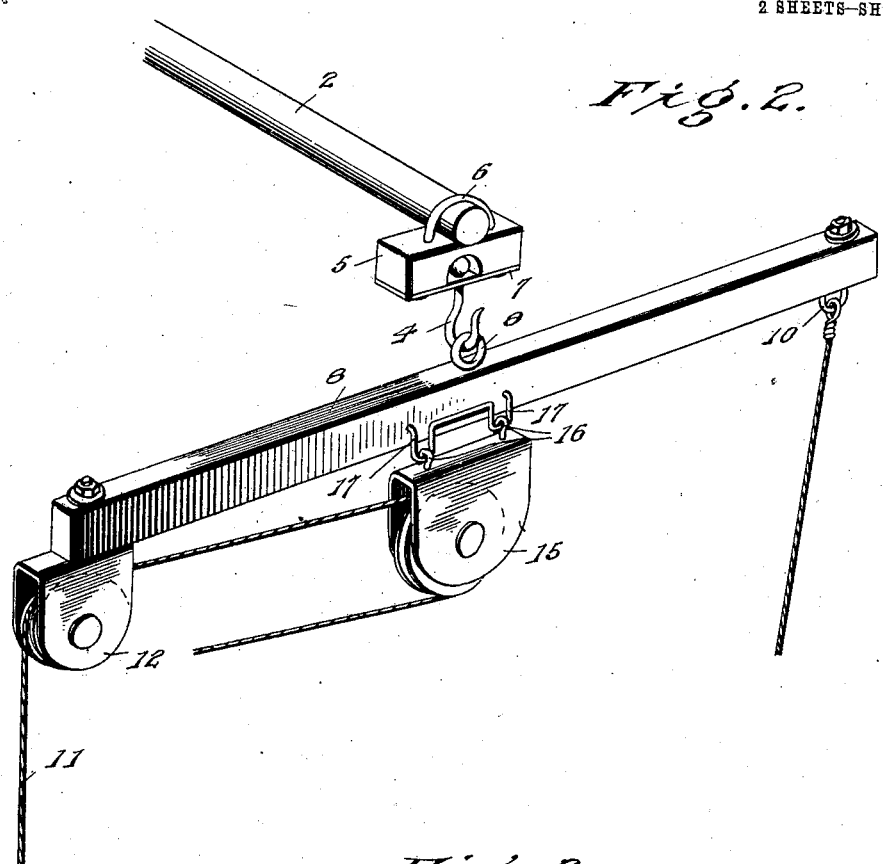
Figure 3:
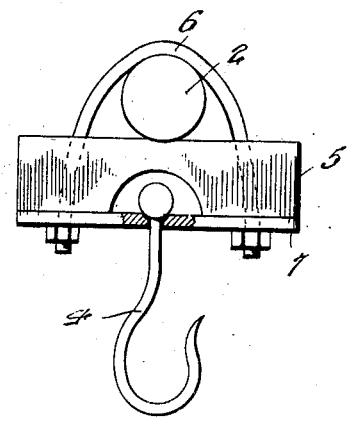

Figure 1 is a side elevation of a hay derrick constructed in accordance with the invention. Fig. 2 is a perspective view of one end of the derrick arm and the hoisting mechanism mounted thereon, and Fig. 3 is a detail view of the swivel connection between the derrick arm and the cross bar.

Corresponding and like parts are referred to in the following description and indicated in all the views of the drawings by the same reference characters.

In carrying out the invention, a suitable supporting frame A is provided, a vertical post 1 being mounted upon this frame so as to turn freely about a longitudinal axis. A derrick arm 2 is applied to the upper end of this post 1 and is held securely in position thereon by means of the diagonal braces 3. No claim is made for this part of the construction, which is similar to that employed in many of the hay derricks now in common use. The derrick arm 2 is preferably arranged at an angle to the vertical post 1, and is provided at its upper end with a swiveled hook 4. In order to obviate the necessity of weakening the derrick arm by boring the usual holes therein, the swiveled hook 4 is carried by a block 5 which is secured to the end of the derrick arm by some suitable form of clamp such as the U bolt 6. As indicated upon the drawing, the hook is swiveled upon the bar 7 which connects the two arms of the U bolt 6 at the bottom of the block 5. A cross bar 8 is supported by means of the swiveled hook 4 so as to turn freely in any direction, the said cross bar normally assuming a horizontal position. An eye 9 is shown as provided at the central portion of the cross bar for engagement with the hook 4.

One end of the cross bar 7 is provided with an eye bolt 10 to which one of the extremities of a cable 11 is secured. This cable also extends around a suitable guide member such as the pulley 12 applied to the opposite end of the cross bar 7, the portion of the cable between the said pulley 12 and the eye bolt 10 being engaged by a block 13 which is provided with the hooks 14 to which the hay or other article to be elevated are secured. With this construction, it will be obvious that the device will have the advantages of a double pulley so that comparatively heavy loads can be readily handled.

After being drawn around the pulley 12, the cable engages a second pulley 15 arranged at substantially the central portion of the cross bar 8. This pulley is pivotally connected to the said cross bar so as to swing laterally and accommodate itself to the cable for all positions of the cross bar. As indicated upon the drawing, the pulley 15 is provided with a pair of hook members 16 which engage eyes 17 pendent from the cross bar. From the pulley 15 the cable 11 may extend rearwardly around a pulley 15ᵃ and downwardly and around a guide member 18 at the base of the supporting frame A, some suitable draft means such as the doubletree 19 being applied to the extremity of the cable. It will thus be obvious that by pulling upon the cable, the hay or whatever else may be attached to the block 13 will be elevated, and after being thus elevated, can be turned into any desired position before being deposited upon the stack.

While I have described one method of applying draft to the end of the cable 11, it will be obvious that the same result could be accomplished in other manners, and that if desired the cable could pass around a guide member at the opposite end of the derrick frame before being carried down to the guide member at the base of the supporting frame A.

More particular attention is directed to the fact that the cross bar is secured to the derrick arm without weakening the same in any manner as by boring holes therein, and that the cross bar is suspended in such a manner as to be turned freely about a vertical axis for the purpose of depositing the hay in any desired position. Owing to the fact that the pulley 15 is arranged at substantially the central portion of the cross bar 8, the pulley upon the cable 11 will not interfere in any manner with the swinging movements of the said cross bar.

Having thus described the invention, what I claim as new and desire to secure by Letters Patent, is:—

1. In a hay derrick, the combination of a supporting frame, a post mounted upon the supporting frame, a derrick arm carried by the post, a cross bar supported by one end of the derrick arm, the middle portion of the cross bar having a swiveled connection with the derrick arm, a guide member on one end of the cross bar, a cable secured to the opposite end of the cross bar and passing around the guide member, a block upon the cable between the said guide member and the end of the cross bar, and a pulley at the central portion of the cross bar around which the cable extends.

2. In a hay derrick, the combination of a supporting frame, a post mounted upon the supporting frame, a derrick arm secured to the post, a cross bar supported by the derrick arm, the middle portion of the cross bar having a swiveled connection with the derrick arm, a guide member at one end of the cross bar, a cable secured to the opposite end of the cross bar and passing around the guide member, a block upon the cable between the said guide member and the end of the cross bar, and a pulley pivotally connected to the middle portion of the cross bar, the cable being passed around the pulley after engaging the guide member.

3. In a hay derrick, the combination of a supporting frame, a post mounted upon the supporting frame, a derrick arm applied to the post, a cross bar having a swiveled connection at its central portion with one end of the derrick arm, a guide member at one end of the cross bar, a cable secured to the opposite end of the cross bar and passing around the guide member, a block upon the cable between the said guide member and the end of the cross bar, a pair of eyes projecting from the middle portion of the cross bar, and a pulley provided with hooks loosely engaging the eyes, the cable passing around the said pulley for engaging the before mentioned guide member.

4. In a hay derrick, the combination of a supporting frame, a post mounted upon the supporting frame, a derrick arm applied to the post, a block, a clamp securing the block to one end of the derrick arm, a swiveled hook mounted upon the block, a cross bar provided at its middle portion with means for engaging the swiveled hook, and hoisting means upon the cross bar.

In testimony whereof I affix my signature in presence of two witnesses.

OTTO R. BECKER.

Witnesses:
PHILIP W. MOTHERSILL,
H. W. CATLIN.